UNITED STATES PATENT OFFICE.

HERBERT LEVINSTEIN AND JAMES BADDILEY, OF BLACKLEY, MANCHESTER, ENGLAND, ASSIGNORS TO LEVINSTEIN LIMITED, OF MANCHESTER, ENGLAND.

DYESTUFFS AND THEIR PRODUCTION.

1,052,262.      Specification of Letters Patent.      Patented Feb. 4, 1913.

No Drawing.      Application filed January 21, 1911. Serial No. 603,868.

*To all whom it may concern:*

Be it known that we, HERBERT LEVINSTEIN, M. Sc., Ph. D., and JAMES BADDILEY, B. Sc., both subjects of the King of Great Britain and Ireland, and both residents of Blackley, Manchester, in the county of Lancaster, England, have invented new and useful New or Improved Dyestuffs and Their Production, of which the following is a specification.

This invention consists in producing valuable azo dyestuffs by combining diazo bodies with esters of naphthol sulfonic acid glycins produced as described in our British specification No. 11877 of 1910. These substances have the following general formula

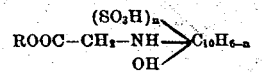

where R represents an alkyl or aryl residue and "n" may be the numeral 1 or 2.

The following are examples of how this invention may be carried into effect:—

Example 1: 61 parts of orthoanisidin are diazotized by means of 180 parts of hydrochloric acid 27° Tw. and 34.5 parts of sodium nitrite in the usual way at a temperature below 5° C. This diazo solution is then slowly run into an aqueous solution containing 203 parts of the ethyl ester of 1-glycin-8-naphthol-3.6-disulfonic acid of the following constitution

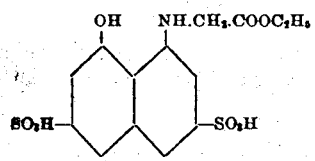

and an excess of sodium carbonate sufficient to keep the reaction mixture alkaline. When the combination is completed the dyestuff is salted out and filtered off. The new dyestuff dyes wool in bright violet shades fast to alkalis. The dyeings become redder and faster to milling on after-treatment with chrome. On reduction the dyestuff yields orthoanisidin and the ethyl ester of 7-amino-1-glycin-8-naphthol-3.6-disulfonic acid. It dissolves in concentrated sulfuric acid with a bluish-red color which on the addition of water gives a solution of the same shade. It is readily soluble in water with a bluish-red color, turning yellower on the addition of caustic soda. It is insoluble in alcohol, ether and benzene.

Example 2: 93 parts of benzidin are tetrazotized in the usual way with 69 parts sodium nitrite and 350 parts of hydrochloric acid 27° Tw. To this tetrazo solution is added an aqueous solution of 76 parts of salicylic acid and 200 parts sodium carbonate. The mixture is well stirred for about an hour and 174 parts of the ethyl ester of 2-glycin-8-naphthol-6-sulfonate of sodium of the following constitution

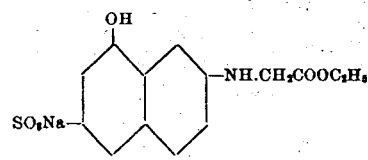

are then run in. When combination is completed, the dyestuff is isolated in the usual manner. It possesses the following constitution

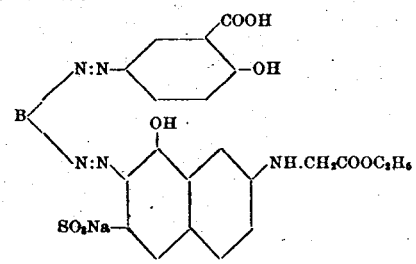

where "B" stands for the diphenyl residue. It dyes cotton in brown shades of good fastness to light acids and alkalis. It is readily soluble in water with a reddish brown color, turning slightly redder on the addition of caustic soda. It dissolves in concentrated sulfuric acid with a bluish-violet color which first becomes redder, and finally gives a brown precipitate on the addition of water. It is insoluble in alcohol ether or benzene.

Example 3: The diazo compound obtained in the usual manner from 15 parts of par-aminoacetanilid is coupled with 22.3 parts of naphthylamin monosulfonic acid Clèves (either the 1.6 or the 1.7 acid, or the commercial mixture of the two) in the presence of an excess of sodium acetate. The intermediate compound so obtained is diazotized in the usual way with 6.9 parts of sodium nitrite. This diazo body is then run into an aqueous solution of 32.5 parts of ethyl ester of 2-glycin-5-naphthol-7-sulfonic acid of the following formula

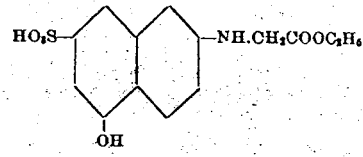

with sufficient sodium carbonate to keep the reaction alkiline. The disazo dyestuff so formed is precipitated from the reaction mixture by the addition of salt, dried and ground. It possesses the following constitution

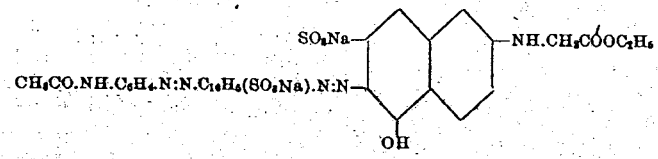

and dyes cotton in blue shades of good fastness to light. It dissolves in concentrated sulfuric acid with a green color which gives a blue violet precipitate on the addition of water. It is readily soluble in water with a blue color becoming greener on the addition of caustic soda. It is insoluble in alcohol, ether or benzene. Instead of combining the dyestuff intermediate product in this example directly with the ethyl ester of 2-glycin-5-naphthol-7-sulfonic acid above mentioned it may be first combined with a further molecule of a suitable middle component such as Clèves acid, and this product may then be re-diazotized and combined with the above named glycin ester. In this way a trisazo dyestuff of the following formula

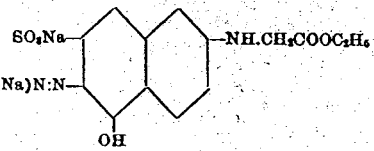

is obtained. It dyes cotton in bright indigo blue shades of excellent fastness to light. It dissolves in concentrated sulfuric acid with a green black solution giving a blue precipitate on the addition of water. It is soluble in water with an indigo blue color which is unchanged on the addition of caustic soda. It is insoluble in alcohol, ether, or benzene.

A very similar dyestuff is obtained if the two molecules of Clèves acid in the above example are replaced by two molecules of alphanaphthylamin, but the paraminoacetanilid must then be replaced by a substance containing a sulfonic acid group such as for instance anilin metasulfonic acid.

Example 4: The intermediate compound obtained by coupling the diazo compound derived from 31.9 parts of 1-amino-8-naphthol-3.6-disulfonic acid with 14.3 parts of alphanaphthylamin is diazotized with 6.9 parts of sodium nitrite, and the requisite amount of hydrochloric acid. The diazo compound so obtained is then combined with 32.5 parts of ethyl ester of 2-glycin-5-naphthol-7-sulfonic acid of the following constitution

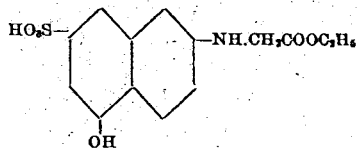

in the presence of an excess of alkali. The dyestuff so obtained has the following formula

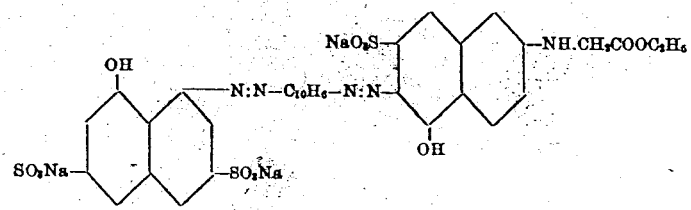

and dyes cotton directly in blue shades of excellent fastness to light. It dissolves in concentrated sulfuric acid with an olive green color which on the addition of water gives first a blue precipitate and finally a reddish violet precipitate. It is readily soluble in water with a blue color turning violet on the addition of caustic soda, and is insoluble in alcohol, ether or benzene.

In all the above examples, in place of the ethyl esters of a naphthol sulfonic acid glycin other esters such as the methyl ester may be employed.

The above are typical examples of how this invention may be carried into effect. We do not bind ourselves to these examples for it is obvious to one skilled in the art that analogous dyestuffs may be prepared by combining other diazo compounds in addition to those described above with the esters of a naphthol sulfonic acid glycin.

We claim:—

1. The production of azo dyestuffs by combining diazo bodies with the esters of naphthol sulfonic acid glycins, substantially as hereinbefore described.

2. Azo dyestuffs produced by combining diazo bodies with esters of naphthol sulfonic acid glycins which dyestuffs have the following general formula

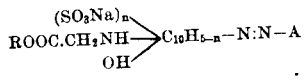

where "R" represents an organic residue, "n" a numeral less than three and "A" an aromatic radical, and which dyestuffs on reduction yield an ester of an amino glycin naphthol sulfonic acid and are soluble in water and in concentrated sulfuric acid and are insoluble in alcohol, ether and benzene.

In witness whereof we have hereunto set our hands in the presence of two subscribing witnesses.

HERBERT LEVINSTEIN.
JAMES BADDILEY.

Witnesses:
WILLIAM GEO. HEYS,
JOHN V. CONWELL.